Patented Feb. 6, 1951

2,540,088

UNITED STATES PATENT OFFICE 2,540,088

SATURATED POLYFLUORO ALICYCLIC HYDROCARBONS AND THEIR PREPARATION

Paul L. Barrick, Wilmington, Del., assignor to E. I. du Pont de Nemours & Company, Wilmington, Del., a corporation of Delaware No Drawing. Application April 23, 1943, Serial No. 484,290

3 Claims. (Cl. 260—648)

This invention relates to the preparation of fluorinated organic compounds and to new organic fluorine compounds. More particularly, the invention comprises a new process for the preparation of polyfluoro saturated hydrocarbons and includes new chemical products consisting of saturated hydrocarbons containing one or more polyfluoroethylene groups per molecule.

Heretofore the only practical method for preparing fluorine-containing organic compounds has been to replace chlorine with fluorine by means of various inorganic reagents, such as hydrogen fluoride, silver fluoride, antimony fluoride, mercuric fluoride and other metallic fluorides. Such processes are very restricted in application and involve considerable expense.

It has also previously been proposed to produce organic fluorine compounds by the reaction of fluorine with various organic materials. Prior investigations have shown that this reaction of fluorine is extremely energetic and generally causes pyrolysis of the organic material, resulting in the formation of carbon, tar or other undesirable carbonaceous decomposition products.

It is an object of this invention to provide a new process for the preparation of polyfluoro saturated hydrocarbons. Another object of this invention is to obtain new compositions of matter consisting of fluorinated saturated hydrocarbons. Still another object is to prepare saturated fluorohydrocarbons which have extreme stability and inertness. A further object is to provide a relatively simple and inexpensive process for readily preparing saturated hydrocarbon compounds containing one or more polyfluoroethylene groups per molecule. A still further object is to obtain saturated fluorinated hydrocarbon compounds possessing many novel and useful properties. Other objects will appear hereinafter.

These objects are accomplished by reacting a polyfluoroethylene containing at least three halogen atoms, of which at least two are fluorine, with a saturated hydrocarbon compound containing aliphatic carbon. By saturated is meant that the hydrocarbon is free of ethylenic and acetylenic unsaturation. This reaction produces saturated polyfluorohydrocarbon products containing at least one polyfluoroethylene unit per molecule of hydrocarbon reactant. The prefix "poly" as used herein refers to the number of fluorine atoms in the fluoroethylene and not to polymeric materials.

A preferred form of the invention may be carried out by reacting tetrafluoroethylene with a saturated hydrocarbon compound containing aliphatic carbon, preferably in a closed system and in the presence of a catalyst. Saturated polyfluorohydrocarbon compounds are obtained containing one or more tetrafluoroethylene units per molecule of hydrocarbon compound. These resulting products may be represented by the general formula $H(CF_2CF_2)_nR$ where $n$ is a positive integer in the range one to about 25, and R is the complementary portion of the hydrocarbon reactant, being a monovalent saturated organic radical containing aliphatic carbon and consisting solely of carbon and hydrogen.

The polyfluoroethylenes suitable for use in this invention may be represented by the general formula $CX_2=CX_2$ where one X is selected from the group consisting of hydrogen and halogen and the other three X's are halogen of which at least two are fluorine.

Saturated hydrocarbon compounds suitable for use in this invention contain aliphatic carbon and consist only of carbon and hydrogen atoms. These saturated hydrocarbon compounds may be acyclic or cyclic, including aliphatic, alicyclic and alkyl-aromatic saturated hydrocarbon compounds consisting solely of carbon and hydrogen atoms. The general formula RH may be used to represent these organic hydrocarbon compounds, where R is the complementary portion of the hydrocarbon reactant, being a monovalent saturated organic radical containing aliphatic carbon and consisting solely of carbon and hydrogen atoms. Thus R may be alkyl, cycloalkyl or aralkyl but not aryl.

The saturated organic hydrocarbon compounds prepared in accordance with this invention may be represented by the general formula $$H(CX_2CX_2)_nR$$

where $n$ is a positive integer in the range 1 to about 25, one X is selected from the group consisting of hydrogen and halogen, the other three X's are halogen, of which at least two are fluorine and R is the complementary portion of the hydrocarbon reactant being a monovalent saturated organic radical containing aliphatic carbon and consisting solely of hydrogen and carbon atoms. In the preferred products, $n$ is a positive integer in the range 1 to 15.

It is also possible to obtain products in which all of the fluoroethylene units are not necessarily connected together and which may be represented by the general formula $$H(CX_2CX_2)_{n-m}—R'—(CX_2CX_2)_mH$$

where $n$ is a positive integer in the range 1 to about 25, $m$ is not greater than $n$ and is an integral number in the range 0 to about 25, one X in each parenthesis is selected from the group consisting of hydrogen and halogen, the other three X's in each parenthesis are halogen of which at least two are fluorine and R' is the complementary portion of the hydrocarbon reactant, being a divalent saturated organic radical containing aliphatic carbon and consisting solely of carbon and hydrogen atoms. It is to be understood that the units in parenthesis correspond to the particular fluoroethylene which is employed in the reaction, although tetrafluoroethylene is the preferred reactant. The sum total of the atoms other than the fluoroethylene units is equivalent to only one molecule of the original hydrocarbon compound. Thus, the saturated hydrocarbon compounds in this invention react with a fluorocarbon, such as tetrafluoroethylene, to yield a series of saturated polyfluorohydrocarbon compounds. The following specific example is given to further illustrate the invention:

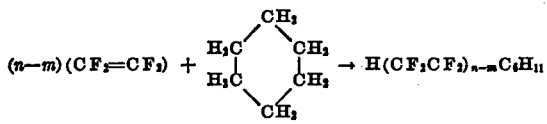

This product may react with additional tetrafluoroethylene as illustrated below:

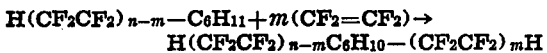

Further reaction with tetrafluoroethylene may also occur. Thus the most general formula representing the new saturated polyfluorohydrocarbon products is $H(CX_2CX_2)_{n-m}—U$ where one X is selected from the group consisting of hydrogen and halogen and the other three X's are halogen of which at least two are fluorine, $n$ is the total number of $(CX_2CX_2)$ groups in the compound and is a positive integer in the range 1 to about 25, $m$ is the number of $(CX_2CX_2)$ groups contained in U and is an integral number in the range 0 to about 25 but is not greater than $n$, and U is a monovalent saturated organic radical containing $m(CX_2CX_2)$ groups and aliphatic carbon other than in said $(CX_2CX_2)$ groups but otherwise consisting solely of carbon and hydrogen atoms.

The method for carrying out the reactions varies to some extent with different types of hydrocarbons, but the usual procedure comprises placing a given amount of a saturated hydrocarbon containing aliphatic carbon and of a polyfluoroethylene, such as tetrafluoroethylene, with or without a catalyst in a high pressure reaction vessel and then closing and heating to the desired reaction temperature while mechanically agitating the reaction vessel for several hours.

In order to prepare the low molecular weight products which are characteristic of this invention, it is usually desirable to carry out the reactions under pressure at elevated temperatures. The temperature at which the reaction is effected may be varied over a wide range, depending largely upon the nature of the reactants, the catalyst, the results desired and other conditions of the reaction. However, the temperature should be below that at which decomposition or pyrolysis of either the reactants or products occurs. No appreciable reaction is obtained below 50° C. and it is usually necessary to heat the reaction mixture to 75° C. or higher in order to obtain a substantial reaction in a reasonable time. The preferred temperature range is 75–300° C., but higher temperatures below the pyrolysis temperature are sometimes desirable.

A series of products are usually obtained which vary from liquids to solids depending upon the hydrocarbon compound and the number of polyfluoroethylene units per molecule of product. In general, the liquid products are compatible with the common organic solvents, whereas the low molecular weight solid products have limited solubility or are insoluble in most solvents.

The invention is further illustrated by the following examples in which the parts are by weight unless otherwise specified.

*Example I*

One hundred and fifteen parts of freshly distilled cyclohexane and 1 part of benzoyl peroxide were charged into a stainless steel autoclave and after cooling and evacuating, 50 parts of tetrafluoroethylene was added. The autoclave was closed and heated at 110° C. with agitation for about 8 hours. On heating up, the temperature of the reaction mixture was found to increase from 98° to 113° C. very quickly, indicating an exothermic reaction. The reaction vessel was cooled to room temperature and the gases bled off. A colorless liquid reaction mixture was obtained and fractionally distilled through an efficient packed column to remove the unreacted cyclohexane and to separate the products into the following fractions:

| Boiling Point | Amount Parts | Refractive Index, $n_D^{25}$ | Analysis | | | Ratio $C_2F_4/C_6H_{12}$ |
| --- | --- | --- | --- | --- | --- | --- |
| | | | F Per Cent | C Per Cent | H Per Cent | |
| 141.5–142° C. | 10 | 1.3841 | 39.83 | 53.21 | 6.83 | 1/1 |
| Calc. for $C_2F_4/C_6H_{12}$ | | | 41.3 | 52.2 | 6.52 | |
| 75–77° C./21 mm. | 12 | 1.3626 | 52.60 | 37.00 | 4.69 | 2/1 |
| Calc. for $(C_2F_4)_2/C_6H_{12}$ | | | 53.5 | 42.2 | 4.22 | |
| 98–106° C./21 mm. | 4.5 | 1.3570 | 58.22 | 34.11 | 3.51 | 3/1 |
| Calc. for $(C_2F_4)_3/C_6H_{12}$ | | | 59.4 | 37.5 | 3.12 | |
| 67–77° C./1.5 mm. | 2.5 | Partially solidified at room temperature. Residue solid at room temperature. | | | | |

Similar results were obtained when lauroyl peroxide was used as the catalyst in place of benzoyl peroxide.

The fraction boiling at 141.5–142° C. was dissolved in carbon tetrachloride and treated with chlorine under the catalytic influence of light for one hour. Upon distillation of the reaction mixture, fractions boiling at 137–145° C./20 mm. and 146–155° C./20 mm. were isolated. Analysis: Calcd. for $C_8H_8F_4Cl_4$: F, 23.6; Cl, 44.1; found: F, 23.52; Cl, 44.66. Calcd. for $C_8H_7F_4Cl_5$: F, 21.3; Cl, 49.8; found: F, 21.87; Cl, 48.86.

*Example II*

A silver-lined high-pressure reaction vessel was charged with 120 parts of isooctane and 1.5 parts of benzoyl peroxide and then evacuated and pressured with tetrafluoroethylene to 350 lbs./in.² The autoclave was heated at 110° C. for 8.5 hours. After cooling the reaction mixture to room temperature, the pressure was released and the reaction mixture was steam distilled. After drying and removing the unreacted iso-octane, a liquid product heavier than water remained. A small amount of a sticky non-steam volatile solid remained in the steam distillation flask.

*Example III*

An autoclave was charged with 1.5 parts of benzoyl peroxide and after evacuating, 125 parts of n-butane and 50 parts of tetrafluoroethylene were added. The autoclave was closed and heated at 110° C. for 7 hours. After cooling the reaction mixture to room temperature, the pressure was released carefully. The 26 parts of liquid products remaining in the autoclave were steam distilled to yield 20.5 parts of steam-volatile liquid, heavier than water ($n_D^{26°C}$, 1.3295), 1.5 parts of steam-volatile solid melting at about 83° C. and 1.5 parts of soft non-steam volatile wax. Fractional distillation of the liquid product through an efficient packed column yielded definite fractions corresponding to the 1/1, 2/1, 3/1 and higher tetrafluoroethylene/n-butane reaction products.

| Boiling Point, °C. | Analysis, F Per Cent | Calc., F Per Cent | Ratio $C_2F_4/C_4H_{10}$ |
|---|---|---|---|
| 87.87.5 | 47.11 | 48.1 | 1/1 |
| 127.5–128.5 | 59.46 | 58.9 | 2/1 |
| 165–167 | 62.88 | 63.7 | 3/1 |
| 60–64/3 mm | 66.34 | 66.35 | 4/1 |

*Example IV*

On repeating Example III using 125 parts of isobutane instead of n-butane, 52 parts of liquid products were obtained. Fractional distillation through an efficient packed column separated the products into definite fractions corresponding to the 1/1 (B. P., 79–80° C.), 2/1 (B. P., 125–125.5° C.), 3/1 (B. P., 164–169° C.) and higher tetrafluoroethylene/isobutane reaction products.

| Ratio $C_2F_4$/isobutane | Boiling Point, °C. | Found, F Per Cent | Calc., F Per Cent | $n_D^{29°C}$ |
|---|---|---|---|---|
| 1:1 | 79–80 | 47.58 | 48.1 | 1.3367 |
| 2:1 | 125–125.5 | 60.18 | 58.9 | 1.3262 |
| 3:1 | 164–169 | 63.24 | 63.7 | 1.3252 |

*Example V*

One hundred and twenty-five parts of propane, 50 parts of tetrafluoroethylene and 1.5 parts of benzoyl peroxide were reacted 9 hours at 80° C. similar to procedure described in Example III. On steam distilling the liquid reaction mixture 19 parts of steam-volatile liquid heavier than water ($n_D^{27}$, 1.3170), 3.3 parts of steam volatile waxy solid melting at about 72° C. and 3.4 parts of non-steam volatile wax melting at about 135° C. were obtained. The liquid products were separated by fractional distillation into definite fractions corresponding to the 1/1, 2/1, 3/1, 4/1 and higher tetrafluoroethylene/propane reaction products.

*Example VI*

A silver-lined high-pressure reactor was flushed with substantially oxygen-free nitrogen and charged with 10 parts of solid zinc chloride. The reactor was evacuated and charged with 125 parts of isobutane and 50 parts of tetrafluoroethylene. The reaction mixture was heated at 175° C. for about 8 hours with agitation. After cooling and bleeding off the reactants, 19 parts of colorless liquid reaction products were obtained. Rectification yielded a series of products boiling from 82° C. to about 250° C. The products contained no chlorine.

| Ratio $C_2F_4$/isobutane | Boiling Point, °C. | Found, F Per Cent | Calc., F Per Cent |
|---|---|---|---|
| 1/1 | 82.7–85 | 48.24 | 48.1 |
| 2/1 | 120–133 | 57.32 | 58.9 |

Repeating the experiment using 75 parts of 85% syrupy phosphoric acid instead of zinc chloride and heating for about 8 hours at 150° C., yielded 13.8 parts of liquid tetrafluoroethylene/isobutane reaction products.

*Example VII*

One hundred and twenty parts of normal hexane, 50 parts of tetrafluoroethylene and 1.5 parts of benzoyl peroxide were reacted 8 hours at 110° C. to yield 17.9 parts of liquid and solid products.

*Example VIII*

Six parts of diethyl peroxide were charged into a large stainless steel autoclave and after cooling and evacuating, 800 parts of n-butane and 400 parts of tetrafluoroethylene were added. The autoclave was closed and heated with agitation for 14 hours at 150° C. After cooling and bleeding off the excess of the reactants, the liquid reaction mixture which remained was found to contain some suspended solid. It was steam distilled to yield 246.9 parts of steam-volatile liquid heavier than water, and 31.8 parts of non-steam volatile waxy solid melting at about 88–95° C. The following results were obtained by fractionally distilling 800 parts of steam-volatile liquid tetrafluoroethylene/n-butane reaction product through an efficient packed column.

| Ratio $C_2F_4/C_4H_{10}$ | Boiling Point, °C. | Amount Parts | Ref. Index $n_D^{25}$ | Spec. Grav. $d_4^{25}$ |
|---|---|---|---|---|
| 1:1 | 83–84.5 | 69 | 1.3354 | 1.1110 |
| 2:1 | 123–131 | 158.6 | 1.3300 | 1.3271 |
| 3:1 | 167–180 | 154.1 | 1.3291 | 1.4864 |
| 4:1 | 78–82/8 mm | 83.2 | 1.3288 | 1.5715 |
| 5:1 | 100.5–116/8 mm | 91.9 | 1.3292 | 1.6366 |

Residue low. Melting solid, 59.4.

Similar results were obtained in other tests using oxygen equivalent to a partial pressure of 2 atmospheres and 1.5 parts of diethyl peroxide with 3 parts of borax as catalysts.

*Example IX*

A stainless steel autoclave was flushed with nitrogen and evacuated and then charged with 125 parts of isobutane and 50 parts of freshly distilled tetrafluoroethylene containing less than 20 P. P. M. of oxygen. The autoclave was closed and heated at 225° C. for 8 hours. After cooling and bleeding, 30 parts of liquid products similar to those described in Example IV were obtained.

On repeating using n-butane, instead of isobutane, 14.1 parts of liquid products were obtained.

On repeating with cyclohexane 37.5 parts of liquid reaction products were obtained. The products were similar to the products which have been described in Example I.

Example X

A mixture of 800 parts of n-butane and 12 parts of benzoyl peroxide were charged into an autoclave and tetrafluoroethylene added to give a pressure of 1500 lbs./in.$^2$ at 120° C. The pressure was maintained at about 1500 lbs./in.$^2$ by injecting tetrafluoroethylene during the course of the reaction which lasted about 15 hours. On cooling, bleeding and steam distilling the reaction mixture, 27.3 parts of steam-volatile liquid products and 192 parts of colorless waxy non-steam volatile solid products melting at about 125° C. were obtained. These waxy products were found to exhibit good lubricating properties.

Example XI

A mixture of 150 parts of paraffin wax, 50 parts of tetrafluorethylene and 1.5 parts of benzoyl peroxide were reacted for 9 hours at 110° C. One hundred and eighty-one parts of oily, low-melting wax was recovered which had improved lubricating properties.

Analysis of wax fraction_____ F. 10.23%

Example XII

A mixture of 125 parts of ethane, 50 parts of tetrafluoroethylene and 1.5 parts of benzoyl peroxide were reacted at 110° C. for 9 hours. There was obtained 14 parts of a colorless solid melting at about 144–146° C.

| | F | C | H |
|---|---|---|---|
| Analysis of solid melting at 144°–146° C. | 58.76 | 35.41 | 2.80 |

Example XIII

A silver tube 0.6" I. D. x 54" long was inserted in a steel tube mounted vertically and heated over a 3 ft. section by means of an electric furnace. The temperature of the tube was measured by means of a thermocouple placed at the center of the furnace between the steel tube and the furnace wall. A mixture consisting of 50 parts of isobutane and 70 parts of tetrafluoroethylene was passed downward through the reaction tube at 494–544° C. during 5.25 hours. The exit gases were passed through a water scrubber, a calcium chloride drying tower and then condensed in a receiver cooled in dry ice-acetone mixture. One hundred and thirteen parts of liquid were recovered. On fractionally distilling through a precision low-temperature still, 11 parts of product boiling above room temperature were obtained.

On repeating the experiment using a mixture of 53 parts of isobutane and 150 parts of tetrafluoroethylene with the reaction tube at 700–750° C., 36 parts of product boiling above room temperature were obtained.

Among the polyfluoroethylenes which are applicable in this invention are trifluorochloroethylene, difluorodichloroethylene, trifluorobromoethylene and trifluoroethylene. However, polyfluoroethylenes containing three fluorine atoms react more readily than the difluoroethylenes. Tetrafluoroethylene is particularly preferred as it reacts the most readily.

The invention is applicable to any saturated aliphatic hydrocarbon which may be acyclic or cyclic and to alkylaromatic hydrocarbons. Examples of straight and branched chained aliphatic hydrocarbons which are operable in this invention include methane, ethane, propane, butane, isobutane, the pentanes, the hexanes, the heptanes, the octanes and higher paraffin hydrocarbons including the paraffin waxes. Substituted and unsubstituted cycloaliphatic hydrocarbons, which are operable, include for example, cyclopropane, cyclobutane, cyclopentane, methylcyclopentane, cyclohexane, methylcyclohexane and decahydronaphthalene. Mixtures of hydrocarbons, such as those present in petroleum products, for example, petroleum ether and a wide variety of higher boiling liquids and oils, which may be cyclic or acyclic are also operable. Alkylaromatic hydrocarbons are included, for example, toluene, ethylbenzene, amylbenzene, the xylenes, cymene and trimethylbenzene. The aliphatic, including the cycloaliphatic, hydrocarbons are preferred as they react more readily than the alkylaromatic hydrocarbons. Polymeric hydrocarbons such as polyethylene and polyisobutylene are also operable in the process of this invention.

It is often desirable to use a catalyst, but the addition of a catalyst is not always necessary as is illustrated by Examples IX and XIII. A wide variety of catalysts are operable including organic and inorganic peroxygen compounds, alkaline catalysts and various acid type catalysts. The peroxygen type catalysts are preferred for use in this invention and examples of them are diacyl peroxide, benzoyl peroxide, lauroyl peroxide, ethyl peroxide, sodium peroxide, hydrogen peroxide, barium peroxide, oxygen, ozone, air and ammonium persulfate. Examples of alkaline catalysts for use in this invention are borax, disodium phosphate, sodium alcoholate, hydrazine, hydrazine salts, trimethylamine oxide, hexachloroethanetrimethylamine oxide, hexachloroethane, hexachloroethane-borax, and peroxide-borax. Among the acid type catalysts which may be used in this invention are Friedel-Crafts type catalysts, zinc chloride and phosphoric acid.

The proportion of catalyst may vary within relatively wide limits depending largely upon the nature of the reactants and the products desired. Although efficient reaction may be effected without the use of catalysts, it is generally preferred to employ a catalyst in this invention. Furthermore, the use of small amounts of catalyst reduces the temperature, time and cost of operation. Highly desirable results may be obtained with the use of an amount of catalyst corresponding to about .001 to 10.0% by weight of the reactants employed. Advantageous results are also sometimes obtained by using a combination of catalysts.

Although a mixture of saturated hydrocarbons may be employed in the present invention, it is preferable to use a single saturated hydrocarbon. It is also preferable that the saturated hydrocarbons not be contaminated with other types of organic compounds. Generally, a relatively large molar excess of the hydrocarbon reactant is used as compared to the more expensive polyfluoroethylene in order to prepare low molecular weight products. However, the desired products may often be obtained by using a relatively small amount of the saturated hydrocarbon since the ratio of polyfluoroethylene units per unit of hydrocarbon in the products varies from 1 to about 25 depending upon the conditions. Usually the molar ratio of hydrocarbon to polyfluoroethylene in the reaction mixture may vary from .04 to 20, but it is preferable to work in the range .1 to 10 in order to obtain the low molecular weight products which are characteristic of this invention.

It will be understood that the operating conditions may vary widely depending upon the nature of the compounds being reacted and also upon the results desired. The time required for carrying out the reaction may vary from a few minutes to several days depending upon the nature of the reactants and the other operating conditions such as temperature, pressure and catalyst.

The process may be operated continuously or intermittently. The reaction may be carried out in a closed system or the reaction may be carried out in the vapor phase by mixing the vapors of the saturated hydrocarbon and polyfluoroethylene and passing the mixture of vapors through a hot reaction tube which if desired may contain a catalyst. The reaction may be carried out under subatmospheric, atmospheric or superatmospheric pressure in the range of .1 to 1000 atmospheres. The preferred pressure range is 1 to 200 atmospheres.

Although there is no objection to the presence of small amounts of water in carrying out the process of this invention, it is preferable that the reaction be conducted under substantially anhydrous conditions. However in certain instances, the presence of water may be advantageous to help dissipate the heat of the reaction.

The reaction may be carried out in any suitable reaction vessel such as stainless steel, iron, silver, aluminum and other metals and alloys which are capable of withstanding heat and pressure. The reaction is preferably carried out with agitation, although agitation is not always necessary.

The present invention is useful for the production of a wide variety of organic fluoro-hydrocarbons. Although it is understood that usually a mixture of compounds with varying ratios of fluoroethylene units per hydrocarbon molecule is obtained, the mixture can generally be separated into various definite fractions by various methods such as steam distillation, fractional distillation, extraction and fractional crystallization. Products with a given ratio of polyfluoroethylene units per hydrocarbon molecule can often be prepared by the proper choice of conditions and catalyst. Increase in pressure favors an increase in molecular weight and thus a higher ratio of fluoroethylene units per molecule of product.

The products can readily be distinguished from the reactants by analysis and by their physical properties. In general, the specific gravity and stability of the products increases while the refractive index decreases with increase in percentage of fluorine in the products. The products of this invention vary from liquids to relatively low molecular weight solids which usually soften or melt below 300° C. when heated in air on a copper block. The liquid products are generally compatible with the common organic solvents but the solid products have a rather limited solubility in most solvents.

The reaction and the separation or isolation of the products may be carried out simultaneously or in separate steps. The products may be separated by filtration, extraction, distillation or crystallization depending upon the nature of the products.

The products of this invention are useful for various commercial purposes. Since all of the products of this invention are extremely stable, they are generally applicable for use as solvents, reaction media, heat transfer media, dielectrics, insulating oils and lubricants. Many of the products have been found to be very desirable in that they are substantially non-flammable, non-corrosive and non-toxic. The saturated fluorohydrocarbon products of this invention have outstanding thermal and chemical stability.

This invention is particularly advantageous in that it affords a safe, flexible, practical and economical process for producing highly fluorinated saturated hydrocarbon compounds. One of the advantages of this invention is that the process may be operated with none or a relatively small amount of catalyst and the reaction proceeds smoothly and easily without undesirable side reactions.

As many apparently widely different embodiments of this invention may be made without departing from the spirit and scope thereof, it is to be understood that I do not limit myself to the specific embodiments thereof except as defined by the appended claims.

I claim:

1. A process for the preparation of saturated polyfluorohydrocarbons, which comprises heating a mixture of tetrafluoroethylene and a saturated alicyclic hydrocarbon at a temperature of from 75° C. to 300° C. in the presence of a peroxygen catalyst, the mole ratio of hydrocarbon to tetrafluoroethylene in the reaction mixture being from 1:1 to 10:1, and separating the resulting saturated polyfluorohydrocarbons from the unreacted materials.

2. A process as claimed in claim 1, conducted in a closed vessel under autogenous pressure.

3. A process for the preparation of saturated polyfluorohydrocarbons, which comprises heating a mixture of tetrafluoroethylene and cyclohexane at a temperature of from 75° C. to 300° C. in the presence of a peroxygen catalyst, the mole ratio of hydrocarbon to tetrafluoroethylene in the reaction mixture being from 1:1 to 10:1 and separating the resulting saturated polyfluorohydrocarbons from the unreacted materials.

PAUL L. BARRICK.

REFERENCES CITED

The following references are of record in the file of this patent:

UNITED STATES PATENTS

| Number | Name | Date |
|---|---|---|
| 2,068,772 | Sixt | Jan. 26, 1927 |
| 2,230,654 | Plunkett | Feb. 4, 1941 |
| 2,411,159 | Hanford | Nov. 19, 1946 |

FOREIGN PATENTS

| Number | Country | Date |
|---|---|---|
| 796,026 | France | Mar. 27, 1936 |
| 824,909 | France | Feb. 18, 1938 |